(12) United States Patent
Laksin et al.

(10) Patent No.: US 7,479,511 B2
(45) Date of Patent: Jan. 20, 2009

(54) WATER BASED ENERGY CURABLE HYBRID SYSTEMS WITH IMPROVED PROPERTIES

(75) Inventors: Mikhail Laksin, Boonton, NJ (US); Ralph Arcurio, Bridgewater, NJ (US); Prasad K. Adhikari, Carlstadt, NJ (US); Subhankar Chatterjee, Hampton, NJ (US); Volker Linzer, Wiesbaden (DE); Richard Czarnecki, Wayne, NJ (US); Jitendra J. Modi, Hazlet, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 415 days.

(21) Appl. No.: 11/103,937

(22) Filed: Apr. 12, 2005

(65) Prior Publication Data

US 2006/0229412 A1    Oct. 12, 2006

(51) Int. Cl.
*C08F 2/46* (2006.01)
*C08J 3/28* (2006.01)
*C09D 11/00* (2006.01)
*C09D 11/02* (2006.01)
*C09D 11/10* (2006.01)

(52) U.S. Cl. .............. 522/84; 522/85; 522/86; 522/80; 522/83; 522/109; 522/110; 522/111; 522/112; 524/800; 524/804; 524/813; 524/812; 524/839; 524/840; 524/845; 106/31.13; 106/31.6

(58) Field of Classification Search .............. 522/84, 522/85, 86, 90, 96, 109, 110, 111, 112; 524/800, 524/804, 813, 812, 839, 840, 845; 106/31.13, 106/31.6

See application file for complete search history.

(56) References Cited

U.S. PATENT DOCUMENTS

| 4,745,138 | A | 5/1988 | Thanawalla et al. | 522/120 |
|---|---|---|---|---|
| 5,665,840 | A | 9/1997 | Pohlmann et al. | 526/264 |
| 6,207,346 | B1 * | 3/2001 | Johnson | 430/284.1 |
| 6,444,378 | B1 * | 9/2002 | Johnson | 430/18 |
| 6,772,683 | B2 * | 8/2004 | Laksin et al. | 101/211 |
| 7,037,953 | B2 | 5/2006 | Chatterjee et al. | |
| 2002/0198289 | A1 * | 12/2002 | Gummeson | 523/400 |
| 2003/0134931 | A1 | 7/2003 | Chatterjee et al. | |
| 2003/0154871 | A1 * | 8/2003 | Laksin et al. | 101/211 |
| 2004/0115561 | A1 | 6/2004 | Laksin et al. | |

FOREIGN PATENT DOCUMENTS

WO    03/070464    8/2003

OTHER PUBLICATIONS

S. B. Maerov. Journal of Applied Polymer Science. vol. 30, Issue 4, pp. 1499-1509.*
U.S. Patent Application Publication No. US2003/0154871 to Laksin et al., published Aug. 21, 2003.
J. M. Loutz, S. Peeters, L. Lindekens, J. Coated Fabrics, 22, p. 298 (1993).
B.M. Monroe and G.C. Weed entitled "Photoinitiators for Free-Radical-Initiated Photoimaging Systems", Chem. Rev. 1993, 93, 435-448.
M. Philips, J.M. Loutz, S. Peeters, L. Lindekens, Polymers Paint Colour J., 183, #4322, p. 38 (1993).

* cited by examiner

*Primary Examiner*—Sanza L McClendon
(74) *Attorney, Agent, or Firm*—Kramer Levin Naftalis & Frankel LLP

(57) ABSTRACT

An energy curable aqueous composition is disclosed containing: water; an ethylenically unsaturated oligomer; and a resin not containing energy curable functional groups.

22 Claims, No Drawings

WATER BASED ENERGY CURABLE HYBRID SYSTEMS WITH IMPROVED PROPERTIES

FIELD OF THE INVENTION

The present invention relates to water based energy curable printing ink or coating compositions with improvement in performance properties containing non energy curable functional resins.

BACKGROUND OF THE INVENTION

Energy curable coating and ink compositions are typically composed of mixtures of acrylated derivatives such as oligomeric acrylates and monomeric acrylates. In most instances, the monomeric materials are employed in the composition to control the viscosity of the coating or ink formulation depending on the particular method of application. However, these monomers often do not react completely during polymerization upon energy curing. Unreacted monomers remain as residual components in the dried printing ink or coated film and are subject to migration by absorption as well as surface contact. This migration of residual components can lead to a host of problems such as "odor" and "off-taste" in sensitive packaging applications such as food packaging. Alternatively, solvents are used to reduce or manipulate the formulation viscosity for appropriate applications. However, the use of solvents is often associated with unacceptable emissions, toxicity, and/or odor levels for more sensitive product applications.

The undesirable characteristics of residual solvents and monomers in specialized coatings and inks has spurred advancement of water based, energy curable compositions, aqueous based curing, and the development of energy curable processes in the presence of water. While typically a poor solvent for organic compounds and having too high surface tension to wet many polymer substrates, water in this instance may nevertheless be the ideal solvent for coating and ink delivery, able to lower viscosity and volatilize without adding to emissions, toxicity, or odor. The challenge is to formulate water compatibility over a wide range of compositions without producing water sensitivity and low rub resistance after curing.

An example of an energy curable composition can be found in EP 287,019. This reference, describes a composition wherein the oligomer is a carboxylic acid containing reaction product of a styrene maleic anhydride copolymer and a hydroxy(meth)acrylate. The composition further contains an ethylenically-unsaturated reactive diluent, a photoinitiator, and optionally a thiol. Exposure of the composition to an actinic source, e.g. a UV light source, results in an aqueous-developable material useful in making printing plates and photoresists. Such a composition would be less useful as a protective coating or a binder in ink specifically due to the designed sensitivity to aqueous development which would lead to low rub resistance when contacted by water.

Another example of an aqueous developable, energy curable composition can be found in EP 287,020. This reference describes an oligomeric material as the reaction product of a mono(meth)acrylate derivative of a caprolactone diol and styrene-maleic anhydride copolymer. The composition further optionally contains a reactive diluent and a photoinitiator. Exposure of the composition to a source of actinic radiation results in a solid cured product useful for making printing plates and photoresists wherein the exposed compositions are developed using an alkaline aqueous developer. Again, such a composition would be less useful as a protective coating or ink binder due to its water sensitivity. In neither of the above cases is delivery of the composition by aqueous solution actually described.

U.S. Pat. No. 5,665,840 discloses a water soluble, crosslinkable prepolymer having in its copolymer chain, as monomeric structural units, a vinyl lactam; a vinyl alcohol; optionally a lower alkane number carboxylic acid vinyl ester; a vinyl crosslinking agent; and optionally a vinylic photoinitiator. This reference also discloses a process for making prepolymers, as well as crosslinked, water insoluble, polymeric networks particularly useful for making hydrogels and water absorbing, molded articles such as contact lenses. Because these cross-linked, water insoluble, polymeric networks swell with water, they would be unsuitable as cured protective coatings and ink vehicles where they would exhibit low resistance to mechanical abrasion when in the presence of moisture.

U.S. Pat. No. 4,745,138 discloses a class of low molecular weight, partial esters of anhydride containing copolymers capable of providing non-aqueous, energy curable, liquid compositions for production of radiation-hardenable coatings without the need to employ an inert organic solvent. These compositions employ monomers containing terminally ethylenically unsaturated groups and maleic anhydride copolymers characterized by having free anhydride functionalities and are said to be particularly suitable for improving adhesion and the dispersive capabilities of binder resins. The partial esters are produced by esterifying a fraction of the anhydride groups by ring-opening with a hydroxyalkyl acrylic compound or an admixture thereof with a monohydric alkyl alcohol. By virtue of the introduction of hydrophobic substituents (particularly the esters of monohydric alkyl alcohols) and the absence of carboxylic acid groups, these compositions cure to films which are more water- and solvent-resistant than those made in accordance with the previous references. However, not discussed in this patent are aqueous solutions of these polymers as provided by hydrolysis of the residual anhydride in dilute caustic, the use of these solutions to stabilize solutions or colloidal dispersions of other, less polar materials, or coating or ink compositions prepared with these solutions.

A parallel approach uses solutions of acrylated, hydrophilic oligomers alone or together with the fore-mentioned polymers. Acrylated oligomers (and solutions of polymer resins made with oligomers) have a viscosity that is typically too high to be used directly for making coatings and printing inks. The use of water as a diluent to lower the viscosity of energy curable, acrylated, oligomeric mixtures has been described in U.S. Pat. No. 6,011,078 wherein the mixtures are used for wood and floor coating applications. The formulations taught in this patent are dispersions or emulsions and require prior evaporation of water followed by exposure to a temperature above the minimum film formation temperature (MFFT) before exposure to the actinic source. Without film formation prior to cure, the resultant energy cured, crosslinked polymer has very weak coherence, lacks adherence to a substrate, and does not provide the rub resistance required. Further, the additional drying step(s) slow the press speed and increase the potential for causing surface defects (e.g., lower gloss).

Acrylic functional polyesters containing salt structures are described by M. Philips, J. M. Loutz, S. Peeters, L. Lindekens, Polymers Paint Colour J., 183, #4322, p. 38 (1993). These are combined with hydrophilic monomers (e.g., polyethyleneglycol diacrylates) and water to make radiation curable, protective coatings. The combinations are described as homogeneous solutions that can be coated and radiation cured by UV with water-soluble photoinitiators to give rub- and wash-resistant top-coats. Also, see J. M. Loutz, S. Peeters, L. Lindekens, J. Coated Fabrics, 22, p. 298 (1993). In reality, all these formulations are very limited in the amount of water that can be incorporated and are comprised of high resin mass fraction (greater than 65 wt. % of vehicle) with consequently high viscosity. Typically, greater than 30 wt. % water on a total liquids (vehicle) basis causes degraded performance in the examples provided. Due to this fact, less than 10 wt. % water is recommended; and even at this water content, "a thermal flash-off step is recommended in order to avoid the formation of microporosity in the film."

Recent discoveries demonstrated the use of ternary system that make it possible to print and cure the inks in one step without prior water evaporation. These inks contain ethylenically unsaturated oligomer and resins and have the properties of high gloss, accelerated cure speed and water and other resistance properties after cure.

SUMMARY OF THE INVENTION

The present invention provides an energy curable aqueous composition comprising:
(a) water;
(b) an ethylenically unsaturated oligomer; and
(c) a resin not containing energy curable functional groups.

Other objects and advantages of the present invention will become apparent from the following description and appended claims.

DETAILED DESCRIPTION OF THE INVENTION

It has been surprisingly discovered that the use of a non reactive resins system in a water based energy curable ink system that provides significant improvements in water resistance, alcohol resistance, adhesion on different substrates as well as significantly improved Theological advantages over water based systems that use entirely energy curable material.

Preferably, the composition of the present invention is an energy curable, aqueous composition comprising water, an ethylenically unsaturated oligomer, and resin containing neutralized acidic or basic functional groups but not energy curable functional groups. Preferably, the components are in such proportions and structures as to achieve greater than 15 wt. % water at less than 60 wt. % resin in the total liquid mass. Further, in the present invention the proportion of water may be freely adjusted so as to achieve any target application viscosity and assure complete cure in processes where drying and curing occur simultaneously without inerting.

In the present invention, as in the prior art, water is used largely as a diluent to control the viscosity of the composition. But in contrast to prior art coating formulations, the invention demonstrates a way to extend the compatibility of water in the composition to a much higher level than previously achieved. With an increase in water compatibility, water can be used to create low odor formulations since the use higher molecular weight (meth)acrylated components is possible while still maintaining an appropriately low viscosity. The resin is dispersible in water when even partially neutralized, and it is so structured so as to allow for a single phase mixture (i.e. solutions) of the ingredients utilized. To accomplish this, the resin comprises both hydrophobic and hydrophilic segments. Only the water insoluble oligomer of the major components listed does not contribute to stabilize an aqueous, single phase composition. Instead, its level is allowed for by the incorporation of hydrophobic elements into the resin and the partially water soluble oligomer.

As used herein the term "solution" is intended to have its conventional meaning as a homogeneous, single phase mixture formed by dissolving one or more substances into another substance, i.e. a single phase liquid or solid. As used herein the term "miscible" is intended to mean that two or more components form a single phase solution. As used herein the term "water soluble" is intended to mean that a component is miscible in water over an extensive concentration range, e.g., 0-90 wt. % water or more in the total mass of the liquid (vehicle) portion, to form a single phase, binary, aqueous solution. As used herein the term "partially water soluble" is intended to mean that a component is miscible in water only over a limited concentration range, e.g. 0 to 70 wt. % water, in forming a single phase aqueous solution. As used herein the term "water dispersible" is intended to mean that a component is blended with water to form a stable emulsion or micro-emulsion. The emulsion or micro-emulsion is stabilized by either the resin structure (self-emulsifying) or by emulsifying additives.

Water

A major component of the compositions of the present invention is water. Water functions as an odor-free diluent used to adjust the viscosity of the composition. Further, water in such quantities as to be retained whole or in part in the applied liquid at the point of cure provides the polymer segment mobility needed for a high degree of cure. And finally, the decreased solubility of oxygen in aqueous media contributes to a rapid rate of cure in the absence of inerting. All these benefits are increased as the proportion of water in the formula is increased. The viscosity's of these solutions can all be adjusted by adjusting the proportions of the miscible diluent and the remaining oligomer provided that the resulting liquid remains a single phase liquid, preferably with water fractions greater than 25 wt. % in the single-phase liquid. The latter is an important point not only for the freedom to adjust viscosity but also in order that water above a certain limit be provided at the point of cure to maintain fluidity and low oxygen tension when curing and drying are occurring simultaneously.

Water Soluble Ethylenically Unsaturated Oligomer

The water soluble oligomer (or the partially water soluble oligomer, vide infra) functions as a lower molecular weight extender. It is typically multifunctional, comprising at least two (meth)acrylate groups. The major requirement other than solubility is that it rapidly builds into the network after initiation of polymerization. The wt. ratio of resin to water-soluble oligomer extender generally ranges from 2.0 to 0.2, preferably 1.0 to 0.4, and most preferably 0.7 to 0.6. The exact choice depends on the structure of both the resin and the oligomeric extender and the type of property most desired (e.g., scratch resistance or water resistance).

The water soluble oligomer preferably forms an aqueous solution within restricted proportions of the oligomer/water components. Thus, a "partially water soluble oligomer" is an oligomer that is miscible in water but only over a limited concentration range, e.g. 0-70 wt. % water in the total mass, to form a single phase aqueous solution.

The water soluble oligomer is a further characterized as a monomer or macromer containing ethylenic unsaturation and which can be polymerized or cross-linked by free radical polymerization. It also contains sufficient water-solubilizing groups such as hydroxyl groups, ethylene oxide segments, and the like to assure at least 5% water uptake in the oligomer/water binary. Preferably, the water soluble oligomer is, for example, selected from acrylates, methacrylates or combinations thereof. Typically, the water soluble oligomer will contain one or more acrylate or methacrylate groups. Acrylates or methacrylates useful as water soluble oligomers in the present invention may, for example, be selected from the group consisting of epoxy acrylates, epoxy methacrylates, polyether acrylates, polyether methacrylates, polyester acrylates, polyester methacrylates, polyurethane acrylates, polyurethane methacrylates, melamine acrylates, melamine methacrylates, ethoxylated trimethanolpropane acrylate, ethoxylated trimethanolpropane methacrylate, ethoxylated di(trimethanolpropane)acrylate, ethoxylated di(trimethanolpropane)methacrylate, ethoxylated pentaerythritol acrylate, ethoxylated pentaerythritol methacrylate, ethoxylated dipentaerythritol acrylate, ethoxylated dipentaerythritol methacrylate, ethoxylated neopentaglycol acrylate, ethoxylated neopentaglycol methacrylate, ethoxylated propylene glycol acrylates, ethoxylated propylene glycol methacrylates, polyethylene glycol diacrylates and polyethylene glycol dimethacrylates. Particularly preferred oligomers are alkyl epoxy acrylates and alkyl epoxy methacrylates.

The water soluble oligomer component may be a single oligomer or a combination of two or more oligomers as described above.

Water Dispersible Resin

The water dispersible resin of the present invention does not contain any energy curable functional groups and forms a stable single phase composition with extensive proportions of the oligomer/water binary components, comprising at least 10 to 50 wt. % or more water in the total liquid. The word resin has its usual connotation for ink and coatings, i.e., a hard solid polymer showing properties typical of higher molecular weight provided by hydrogen-bonded structures without actually being high molecular weight. The preferred weight average molecular weight is greater than 1000 but less than 100,000 daltons, more preferably greater than 1000 but less than 50,000 daltons, and most preferably greater than 1000 but less than 30,000 daltons.

Further, in the present invention, the water dispersible resin is a particular type of surface-active material made of hydrophilic (e.g., ionic and hydrogen-bonding groups such as carboxyl) and hydrophobic (e.g., hydrocarbon) structures (as pendant groups or as main chain segments). For example, the resin may have acid-functional groups (e.g. pendant carboxylic acid groups) which are partially or totally neutralized with a base (e.g., an amine) to form a water-soluble resin salt. Alternatively, the polymeric resin may have basic functional groups (e.g. amino groups) which are partially or totally neutralized with an acid (e.g. a carboxylic acid) to form a water soluble resin salt. The carboxylic acid functional groups, which are neutralized with a base, may be in such number as to generate an acid number of greater than 60 (mg of KOH to completely neutralize 100 g of resin) to assure water dispersibility over at least a portion of the water/resin binary. And preferably, the resin also contains hydrophobic substituents (e.g., esters of aliphatic alcohols) to an extent that generates good pigment dispersing properties, water resistance, and properties consistent with the above requirements.

A particularly preferred water dispersible resin is a Polyurethane-urea copolymer containing hard (e.g. short chain diols or diamines) and soft (long chain alkyloids, ethylene- or propelene glycols or polyetherdiols) segments reacted with aliphatic or aromatic diisocyanates. In addition, increasing the extent of neutralization of the acid groups by caustic, or by the choice of more highly hydrated caustic (e.g., lithium hydroxide), the hydrophilicity can be increased. By use of these tools, the resin can be made to be water-dispersible, to stabilize colloidal dispersions and solutions of mixtures with partially water-soluble and water-insoluble oligomers, to stabilize pigment dispersions, and yet to resist water in the final cured product.

While any basic compound (e.g., alkali metal hydroxides such as sodium hydroxide, potassium hydroxide, or lithium hydroxide or amines such as ammonia, alkyl amines, or amine-containing oligomers) may be used to neutralize the acidic groups of the resin, ammonia, amines or combinations thereof, are preferred. A preferred base is selected from tertiary amines.

Water Insoluble Ethylenically Unsaturated Oligomers

While the water insoluble oligomer typically is totally immiscible in water, the water insoluble oligomer may form a solution with the water soluble oligomers. The water insoluble oligomer is preferably miscible in the water soluble oligomer over an extensive concentration range, e.g., 5 to 95 wt. % water insoluble in the total blend, to form a single phase, binary solution. Typically, the water insoluble oligomers are compounds (or mixtures of similar compounds), which have one, two, or more terminal ethylenically unsaturated groups. Representative of such compounds, for example, include: dipropylene glycol diacrylate; tripropylene glycol diacrylate; butanediol diacrylate; hexanediol diacrylate; alkoxylated hexanediol diacrylate; trimethyol propane triacrylate; alkoxylated trimethylol propane triacrylate; di(trimethylol propane triacrylate); glycerolpropoxy triacrylate; pentaerythritol triacrylate; alkoxylated pentaerythritrol triacrylate; di(pentaerythritrol triacrylate); neopentaglycol diacrylate; alkoxylated neopentaglycol diacrylate; dipropylene glycol dimethacrylate; tripropylene glycol dimethacrylate; butanediol dimethacrylate; hexanediol dimethacrylate; alkoxylated hexanediol dimethacrylate; trimethyol propane trimethacrylate; alkoxylated trimethylol propane triamethcrylate; di(trimethylol propane methtriacrylate); glycerolpropoxy trimethacrylate; pentaerythritrol trimethacrylate; alkoxylated pentaerythritrol trimethacrylate; di(pentaerythritrol trimethacrylate); neopentaglycol dimethacrylate; alkoxylated neopentaglycoldimethacrylate; and the like and combinations thereof. The water-insoluble oligomer may contain a combination of diacrylic and triacrylic monomers along with a monomer containing a single terminal ethylenic group. The water insoluble oligomers may be acrylated epoxy resins; bis acrylic esters of bisphenol A; acrylated polyurethanes; acrylated polyesters; acrylated polyether and the like. Preferred water-insoluble oligomers of this type include di-(3-methacryloxy-2-hydroxypropyl ether of bisphenol-A; di(2-methacryloxyethyl ether of bisphenol-A; di-(3-acryloxy-2-hydroxypropyl ether of bisphenol-A; di(2-acryloxyethyl ether of bisphenol-A; and the like.

Free Radical Photoinitiator

Any of the previously described energy curable aqueous compositions of this invention may contain a photoinitiator. Unless the composition is formulated specifically for use with electron beam curing, the energy curable composition will typically contain an addition polymerization photoinitiator that generates free radicals upon exposure to actinic radiation, such as ultraviolet light. Such a photoinitiator has one or more compounds that directly furnish free radicals when activated by actinic radiation. The photoinitiator may also contain a sensitizer that extends the spectral response into the near ultraviolet, visible or near infrared spectral regions. In free radical initiated curing systems, typically irradiation of a photoinitiator produces free radicals that initiate polymerization and/or crosslinking. Typically, only small amounts of photoinitiator are required to effectively initiate a polymerization, e.g. from about 0.5 wt. % to about 5 wt. % based on the total weight of the polymerizable (curable) solution. Typically, the photoinitiator is readily soluble in at least one of the major components of the energy curable solution; and it is preferably at least partially soluble in water. Still more preferably, the free radical curing system comprises a photoinitiator that is substantially soluble in one or more of the major components in the single phase solution of the present invention. A wide variety of photoinitiators may be used in the aqueous compositions of this invention. Useful photoinitiators of this type are, for example, described in a review by B. M. Monroe and G. C. Weed entitled *"Photoinitiators for Free-Radical-Initiated Photoimaging Systems"*, Chem. Rev. 1993, 93, 435-448, which is incorporated herein by reference. Preferred photoinitiators, suitable for use alone or in combination with other photoinitiators, are Irgacure 1173, Irgacure 500, Irgacure 184, Irgacure 2959 (Irgacure is a trademark and commercially available product of Ciba Specialty Additives, Tarrytown, N.Y.), Esacure KIP 150, Esacure KIP EM and Esacure KIP DP 250 (Esacure is a Trademark and commercially available product of Lamberti, Gallarate, Italy).

Colorants

The energy curable inks of this invention contain one or more colorants in the form of a dye or pigment dispersed therein. Pigments suitable for use in the present invention include conventional organic or inorganic pigments. Representative pigments may, for example, be selected from the group Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48:2, Pigment Red 53:1, Pigment Red 57:1, Pigment Red 81:1, Pigment Red 112, Pigment Red 122, Pigment Red 170, Pigment Red 184, Pigment Red 210, Pigment Red 238, Pigment Red 266, Pigment Blue 15, Pigment Blue 15:1, Pigment Blue 15:2, Pigment Blue 15:3, Pigment Blue 15:4, Pigment Blue 61, Pigment Green 7, Pigment Green 36, Pigment Violet 1, Pigment Violet 19, Pigment Violet 23, Pigment Black 7. Pigment compositions which are a blend of conventional pigment and poly(alkylene oxide) grafted pigments are also suitable for use in the energy curable inks of this invention and are described in U.S. Pat. Nos. 4,946,508; 4,946,509; 5,024,698; 5,024,894; and 5,062,894 each of which is incorporated herein by reference.

Adjuvants

The energy curable compositions and inks of this invention may contain the usual adjuvants to adjust flow, surface tension and gloss of the cured coating or printed ink. Such adjuvants contained in inks or coatings typically are a surface-active agent, a wax, or a combination thereof. These adjuvants may function as leveling agents, wetting agents, dispersants, defrothers or deaerators. Additional adjuvants may be added to provide a specific function such as surface slip. Preferred adjuvants include fluorocarbon surfactants such as FC-4430 (commercially available product of the 3M Company, St Paul, Minn.); silicones such as DC57 (commercially available product of Dow Chemical Corporation, Midland, Mich.), Byk 024, Byk 019, Byk 023, Byk 373, Byk 381, Byk 3500, Byk 3510, Byk 3530, Byk 361, Byk 363 (commercially available products of Byk Chemie, Wesel, Germany) Foamex N, Foamex 8030, Foamex 810, Airex 900, Tegorad 2100, Tegorad 2200N, Tegorad 2250N, Tegorad 2500, Tegorad 2600 (Foamex, Airex and Tegorad are trademarks and are commercially available products of Tego Chemie, Essen, Germany.), Addid 700, Addid 810, Addid 840, Addid 300, Addid 310, Addid 320 (Addid is a trademark and commercially available from Wacker Silicones Corp., Adrian, Mich.); organic polymer surfactants like, Solspers 24000, Solspers 32000, Solspers 41090, Solspers 20000, Solspers 27000 (Solspers is a trademark and commercially available from United Color Technology, Inc., Newton, Pa.) Disperbyk 168, Disperbyk 184, Disperbyk 190, Disperbyk 192 (Disperbyk is a trademark and commercially available from Byk Chemie, Wesel, Germany.), Wet 500, Wet 505, Airex 920, Airex 910, Dispers 610, Dispers 605, Dispers 740, Dispers 750 and Dispers 760 (Dispers, Wet and Airex are trademarks and are commercially available from Tego Chemie, Essen, Germany.) Surfanol 105E, Surfanol 420, Dynol 604 (Surfanol and Dynol are trademarks and are commercially available from Air Products and Chemicals Inc., Allentown, Pa.); polyethylene wax; polyamide wax; polytetrafluoroethylene wax; and the like.

Preparation of Energy Cured Film

An embodiment of this invention is a method of forming a film and/or a printed ink image. Thus, the energy curable compositions of this invention may be applied to a variety of substrates and cured by a variety of methods for applications that include protective, decorative and insulating coatings; potting compounds; sealants; adhesives; photoresists; textile coatings; and laminates on a variety of substrates, e.g., metal, rubber, plastic, wood, molded parts, films, paper, glass cloth, concrete, and ceramic. The energy curable compositions of this invention are particularly useful in the manufacture of coatings and printing inks for use in a variety of Graphic Art applications and printing processes. Advantageously, the compositions of this invention cure without the prior removal of water. Moreover, the energy curable compositions derived therefrom, are particularly useful in the wet-trap printing application.

The embodiment of this invention directed to a method for forming a cured, water-resistant ink or coating on a substrate comprises applying to a substrate the energy curable aqueous compositions of the invention to form a layer and subsequently subjecting the coated substrate to a source of actinic radiation. However, if the method is specifically directed to forming a water-resistant ink, the method additionally requires adding a colorant to the aqueous composition. The energy curable, aqueous composition may be any of the energy curable, aqueous compositions of this invention.

The aqueous composition may be applied to the substrate surface as a coating in a uniform layer using any conventional coating technique. Therefore, compositions of the present invention may be applied by spin coating, bar coating, roller coating, curtain coating or by brushing, spraying, etc. Alternatively, the aqueous composition may be applied imagewise to a substrate surface, for instance as a printing ink, using any conventional industrial printing technique including flexographic, gravure, screen, lithographic, and ink jet printing.

The actinic radiation initiated cure is most effectively done with the water of the formula in place. Water as solvent lowers the viscosity permitting the reactive sites of polymerization to diffuse in the system and to propagate effectively to generate longer chains. The viscosity point at which effective reaction ceases is known as the vitrification point. In the presence of water above a critical level, a very low residual functionality remains after initiation of the polymerization, as vitrification is delayed by the decreased viscosity. Water also decreases the level of dissolved oxygen in the coating. This fact leads to more rapid cure as well.

From the moment the coating or ink of the present invention is applied, water starts evaporating. UV lamps and electron beams under nitrogen flow provide heat and gas flow that accelerates water removal. Depending on the characteristics of the particular cure unit operating as a dryer, there is a maximum level of water that will be removed per unit time in the curing zone. Without implying a limit, it is evident from the discussion above that a certain fraction of water must remain in the coating at the point of exit from the cure unit. In most cases, however, less water than the measured maximum can be coated without increasing the residual acrylic unsaturation, i.e., the rate of drying slows as the critical limit is approached. In our experience, the practical lower limit is ⅓ of the amount estimated from the maximum drying capacity. Characteristic of having water in place at the point of cure, the liquids of the present invention at greater than 15 wt. % water in the liquid phase cure to such complete conversion that no acrylate unsaturation can be detected by the usual reflection infrared techniques used in the industry.

Substrate

The substrate and its surface may be composed of any typical substrate material such as plastics, metals, composites, papers, etc.; and the energy cured film or layer on the substrate may be used in a variety of applications. The substrate may be print stock typically used for publications or may be a packaging material in the form of a sheet, a container such as a bottle or can, or the like. In most instances, the packaging material is a polyolefin such as a polyethylene or a polypropylene, a polyester such as polyethylene terphthalate, or a metal such as an aluminum foil, a metalized polyester, or a metal container. Once the aqueous, single phase, energy curable composition is applied to the packaging material it may be used to contain any kind of liquid or solid material such as foods, drinks, cosmetics, biological materials or specimens, pharmaceuticals, etc.

EXAMPLE 1

Four energy curable compositions (A, B, C and D) were prepared as described in Table 1. Composition A is the experimental composition containing a polyurethane resin not containing energy curable functional groups while compositions B-D contain resins with energy curable functional groups. Formulation E is a standard process cyan of SunChemical NAI Sunsheen series containing polyamide resin which was tested along with compositions A-D (Table 2 below).

TABLE 1

| Composition | A | B | C | D |
|---|---|---|---|---|
| Polyurethane (A) | 15 | | | |
| SMA Acrylate (B) | | 15 | | |
| Urethane Acrylate (C) | | | 8 | |
| Urethane Acrylate (D) | | | | 8 |
| Pigment* | 15 | 15 | 15 | 15 |
| Hyperdispersant** | 10 | 10 | 10 | 10 |
| Water | 10 | 10 | 17 | 17 |
| Reactive Oligomer Composition*** | 50 | 50 | 50 | 50 |
| Total | 100 | 100 | 100 | 100 |

A: Proprietary anionic Polyurethane water dispersion 940-1021 about 30-35% solid matter supplied by SunChemical
B: Proprietary alcohol modified Styrene-Maleic Anhydride Acrylate Resin 924-1069 45-55% solid matter manufactured by SunChemical and described in WO99/19369
C: Proprietary Acrylated Polyurethane Resin Ebecryl 2001 about 100% solid matter as supplied by UCB Surface Specialties
D: Proprietary Acrylated Polyurethane Resin Actilane 245 about 100% solid matter, supplied by Akcros, Sartomer Company Inc.
*SunChemical Sunfast 249-1290
**Disperby 184 as supplied by Byk Chemie
***Proprietary letdown formulation as described in WOO3070464 (A1) and US2003154871 (A1)

The above described compositions were printed on two different substrates commonly used in the packaging industry using a bladed Harper Echocell Juniour handprofer. Prior to printing the applied substrates were corona treated to a level of about 40 dyne. The prints were than cured using an AET electron beam lab unit with a dose rate of 3.0 mRad (30.0 kGy) at 110 kV and an oxygen level of about 200 ppm.

The prints were than tested for industry standard tape adhesion and solvent rub resistance. The rub resistance was determined by wetting the cotton tip of a cotton tipped applicator (Puritan REF 806-WC, Hardwood Products Company LP) and employing light finger pressure to rub the ink off as detected by discoloration of the ink. The number of complete back-and-forth cycles required is recorded. Coating adhesion was measured by taking a convenient length of 600 or 610 tape (from 3M Co., St. Paul, Minn.), laminating the tape to the cured surface under finger pressure, then lifting the tape from the surface in one rapid motion at right angle to the coated surface. The adhesion was rated a pass when the coating remained completely intact and adhered to the substrate following tape peel.

Results of the performance properties of described inks are listed in Tabel 2. As evident from the testing the ink made of composition "A" has far superior water, alcohol and MEK rub resistance than any of the other tested ink formulations. On the oriented Polypropylene film (AET T523-3) the tape adhesion properties of composition "A" is far superior than all the other energy curable test ink compositions applied.

TABLE 2

| Results of Testing of Compositions A-E. | | | | | | | |
|---|---|---|---|---|---|---|---|
| Drawdown with 5501 pi anilox roller on a bladed Harper Echocell Junior handproofer | | | | | | Tape adhesion | Tape adhesion |
| Composition | Resin Type | Substrate | Water Rubs$ | Alcohol Rubs$ | MEK Rubs$ | Scotch 610$$ | Scotch 600$$ |
| Hybride Flexo Ink | Polyurethane (A) | PE* | >100 | >100 | 40 | pass | pass |
| EC Test Ink 1 | SMA Acrylate (B) | PE* | >100 | 21 | 3 | pass | pass |
| EC Test Ink 2 | Urethane Acrylate (C) | PE* | >100 | 14 | 2 | pass | pass |

TABLE 2-continued

Results of Testing of Compositions A-E.

Drawdown with 5501 pi anilox roller on a bladed Harper Echocell Junior handproofer

| Composition | Resin Type | Substrate | Water Rubs$ | Alcohol Rubs$ | MEK Rubs$ | Tape adhesion Scotch 610$$ | Tape adhesion Scotch 600$$ |
|---|---|---|---|---|---|---|---|
| EC Test Ink 3 | Urethane Acrylate (D) | PE* | >100 | 18 | 2 | pass | pass |
| Conventional Solvent% | Polyamid (E) | PE* | >100 | 1 | 1 | pass | pass |
| Hybride Flexo Ink | Polyurethane (A) | OPP** | 40 | >100 | 40 | pass | pass |
| EC Test Ink 1 | SMA Acrylate (B) | OPP** | 6 | 10 | 2 | fail | fail |
| EC Test Ink 2 | Urethane Acrylate (C) | OPP** | 3 | 8 | 2 | fail | fail |
| EC Test Ink 2 | Urethane Acrylate (D) | OPP** | 5 | 12 | 2 | fail | fail |
| Conventional Solvent% | Polyamid (E) | OPP** | 12 | 1 | 1 | pass | pass |

$Number of double strokes with a water, iso-propanol or MEK soaked Q-Tip
$$Standard tape test with Scotch 600 and 610 grade tape film rated pass when no ink was lifted off of the substrate
A: Proprietary anionic polyurethane water dispersion
B: Proprietary alcohol modified Styrene-Maleic Anhydride Acrylate Resin 924-1069 manufactured by SunChemical and described in WO99/19369
C: Proprietary Acrylated Polyurethane Resin Ebecryl 2001 as supplied by UCB
D: Proprietary Acrylated Polyurethane Resin Actilane 245 as supplied by Akcros
E: Conventional Polyamid resin as used in conventional solvent based inks in concentrations of 3-10% solid matter and supplied by Cognis, Arizona Chemicals and others
*Standard 1 micron white LDPE film treated to 42 dyne
**Standard AET T523-3 corona treated oPP film
%Proprietary Conventional ink formulation as used for the described substrates and manufactured by Sun Chemical and other ink companies The invention has been described in terms of preferred embodiments thereof, but is more broadly applicable as will be understood by those skilled in the art. The scope of the invention is only limited by the following claims.

What is claimed is:

1. An energy curable aqueous composition comprising:
   (a) water;
   (b) an ethylenically unsaturated oligomer; and
   (c) a resin not containing energy curable functional groups, wherein the resin contains neutralized acidic and/or basic functional groups, and wherein said resin allows for a single phase homogeneous solution in said water.

2. The composition of claim 1, wherein the oligomer is partially water soluble.

3. The composition of claim 1, wherein the oligomer is a mixture of a partially water soluble oligomer and a water insoluble oligomer.

4. The composition of claim 2, wherein the partially water soluble oligomer is selected from the group consisting of an acrylate oligomer, a methacrylate oligomer and a combination thereof.

5. The composition of claim 4, wherein the acrylate oligomer and methacrylate oligomer respectively contain more than one acrylate and more than one methacrylate functional groups.

6. The composition of claim 4, wherein the acrylate oligomer is selected from the group consisting of epoxy acrylate, polyether acrylate, polyester acrylate, polyurethane acrylate, polyol acrylates, melamine acrylate, ethoxylated trimethanolpropane acrylate, ethoxylated di(trimethanolpropane) acrylate, ethoxylated pentaerythritol acrylate, ethoxylated dipentaerythritol acrylate, ethoxylated neopentaglycol acrylate, ethoxylated propylene glycol acrylates, and polyethylene glycol diacrylate; and the methacrylate oligomer is selected from the group consisting of: epoxy methacrylate, polyether methacrylate, polyester methacrylate, polyurethane methacrylate, polyol methacrylates, melamine methacrylate, ethoxylated trimethanolpropane methacrylate, ethoxylated di(trimethanolpropane) methacrylate, ethoxylated pentaerythritol methacrylate, ethoxylated dipentaerythritol methacrylate, ethoxylated neopentaglycol methacrylate, ethoxylated propylene glycol methacrylates, and polyethylene glycol dimethacrylate.

7. The composition of claim 6, wherein the acrylate and methacrylate oligomers are epoxy acrylate and epoxy methacrylate, respectively.

8. The compositions of claim 3, wherein the water insoluble oligomer is selected from the group consisting of epoxy acrylate, polyether acrylate, polyester acrylate, polyurethane acrylate, polyol acrylates, propylene glycol acrylates; alkanediol acrylates, trimethylol propane acrylates, glycerolpropoxy acrylates, pentaerythritrol acrylates, neopentaglycol acrylates; and the methacrylate oligomer is selected from the group consisting of: epoxy methacrylate, polyether methacrylate, polyester methacrylate, polyurethane methacrylate, polyol methacrylates, propylene glycol methacrylates; alkanediol methacrylates, trimethylol propane methacrylates, glycerolpropoxy methacrylates, pentaerythritrol methacrylates, neopentaglycol methacrylates.

9. The composition of claim 1, wherein the resin contains carboxylic acid functional groups.

10. The composition of claim 1, wherein the resin is selected from the group of polyester, polyurethane, polyacrylic, polyvinyl,polyurea, polyamid, polyol, polycarboxylic acid, polystyerene/maleic anhydride copolymer, or copolymers thereof.

11. The composition of claim 1, wherein the resin is a non energy curable functional Polyurethane-Urea copolymer.

12. The composition of claim 9, wherein the carboxylic acid functional groups are neutralized with a neutralizing agent or mixture of neutralizing agents.

13. The composition of claim 12, wherein the neutralizing agent is selected from the group consisting of ammonia, amines, alkali metal hydroxides or a mixture thereof.

14. The composition of claim 9, wherein the resin has an acid number greater than 60 and a weight average molecular weight between 1,000 and 100,000 daltons.

15. The composition of claim 1, wherein the functional groups contained by the resin are amino basic groups neutralized with an acid.

16. The composition of claim 1, further comprising a free-radical photoinitiator.

17. The composition of claim 1, wherein water is greater than 15 wt %.

18. The composition of claim 1, wherein the resin containing neutralized acidic or basic functional groups is less than 60 wt. % of the total weight of the composition.

19. The composition of claim 18, wherein water is greater than 15 wt % of the total weight of the composition.

20. The composition of claim 1, further comprising a colorant.

21. The composition of claim 1, further comprising a photoinitiator.

22. The composition of claim 1, further comprising an adjuvant.

* * * * *